United States Patent [19]

Mink

[11] 4,139,104
[45] Feb. 13, 1979

[54] MATERIAL HANDLING APPARATUS

[76] Inventor: George Mink, 13130 Geoffrey, Warren, Mich. 48092

[21] Appl. No.: 818,808

[22] Filed: Jul. 25, 1977

Related U.S. Application Data

[63] Continuation of Ser. No. 599,058, Jul. 25, 1975, abandoned, which is a continuation-in-part of Ser. No. 506,113, Sep. 16, 1974, Pat. No. 3,972,422, and Ser. No. 583,099, Jun. 2, 1975, Pat. No. 4,002,245.

[51] Int. Cl.² .............................................. B65G 47/90
[52] U.S. Cl. ................................ 214/1 BB; 214/1 BC
[58] Field of Search ............... 214/1 BB, 1 BC, 1 BD, 214/1 BH, 1 BS, 1 B, 1 BT, 1 BI, 147 T, 147 G, 151, 1 CM; 198/479, 486, 489, 490

[56] References Cited

U.S. PATENT DOCUMENTS

| | | | |
|---|---|---|---|
| 2,811,267 | 10/1957 | Bock | 214/1 BC X |
| 2,833,434 | 5/1958 | Stover et al. | 198/486 X |
| 2,974,811 | 3/1961 | Dammert et al. | 214/1 BC |
| 3,047,166 | 7/1962 | Lamp et al. | 214/1 BC |

Primary Examiner—Frank E. Werner
Attorney, Agent, or Firm—Harness, Dickey & Pierce

[57] ABSTRACT

An improved, low cost material handling apparatus adapted to grip a workpiece and move it from one place to another. The apparatus includes a pair of motion transfer devices, each of which is adapted to move a gripper in a respective direction between first and second extreme positions. One of the motion transfer devices moves the gripper in a pivotal direction. A timing mechanism is included that operates the motion transfer devices in sequence so as to move the workpiece from a home position to a work position. The mechanism also includes means for automatically moving the gripper between its gripping position and its released position when the workpiece is so transferred. By a relatively simple adjustment the sequence of operation may be reversed.

3 Claims, 5 Drawing Figures

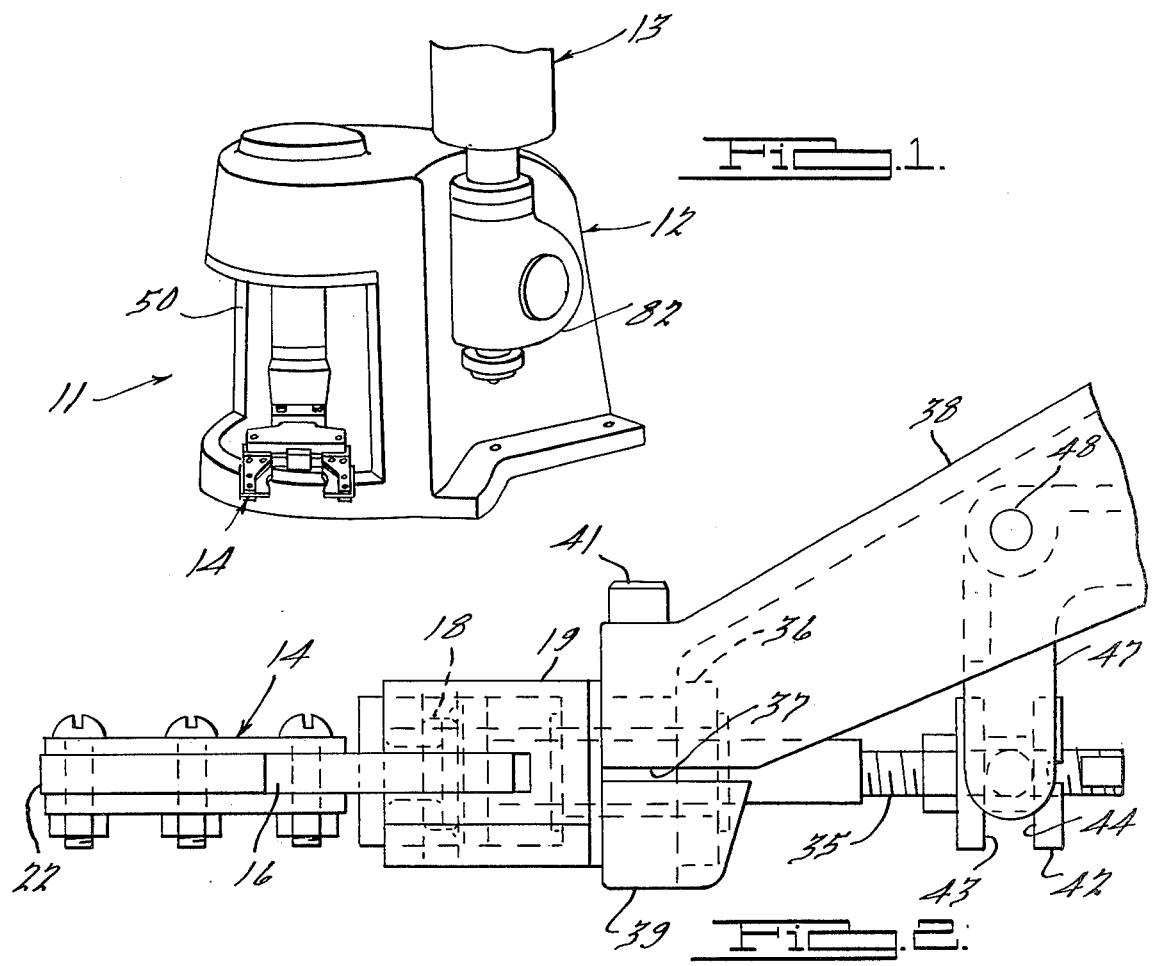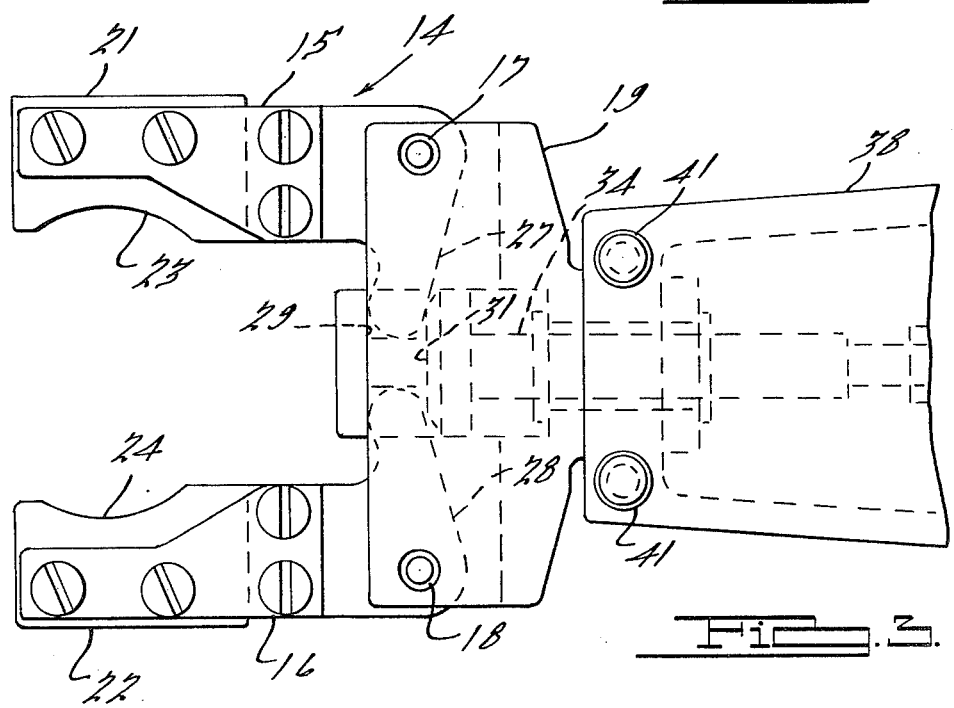

MATERIAL HANDLING APPARATUS

CROSS REFERENCE TO RELATED APPLICATION

This application is a continuation of my application of the same title, Ser. No. 599,058 filed July 25, 1975, now abandoned, which application is a continuation-in-part of my applications of the same title, Ser. No. 506,113, filed Sept. 16, 1974, now U.S. Pat. No. 3,972,422 granted Aug. 3, 1976 and Ser. No. 583,099, filed June 2, 1975, now U.S. Pat. No. 4,002,245, granted Jan. 11, 1977.

BACKGROUND OF THE INVENTION

This invention relates to a material handling apparatus and more particularly to a simplified, improved material handling apparatus for positioning workpieces or the like.

In many machine operations or other automated operations it is desirable to provide a mechanism that can move a workpiece between two different positions. Such material handling apparatus should be designed so as to permit a latitude in the sequence of movement, to insure against damage to the workpiece and associated mechanism in the event of jamming and should be relatively low in cost.

It is, therefore, a principal object of this invention to provide an improved, low cost material handling apparatus.

It is another object of the invention to provide a material handling apparatus that is adapted to move workpieces between two different positions at least partially in a pivotal direction and accomplishes this result by a relatively low cost mechanism.

It is a further object of the invention to provide a material handling apparatus that permits a wide latitude in degrees of movement and in sequence of operation.

SUMMARY OF THE INVENTION

This invention is adapted to be embodied in a material handling apparatus that includes gripping means for releasably restraining a workpiece. Support means are provided for the gripping means. A first motion transfer means is incorporated for pivotally moving the support means for movement in a first direction between a first extreme position and a second extreme position. A second motion transfer means is provided for moving the support means in a second direction between a first extreme position and a second extreme position. The second direction is angularly related to the plane of movement of the first direction. Timing means operate the motion transfer means so that the supporting means is moved in sequence by the respective motion transfer means from a home position to a work position.

BRIEF DESCRIPTION OF THE DRAWINGS

FIG. 1 is a perspective view of a material handling apparatus embodying this invention.

FIG. 2 is an enlarged side elevational view of the gripping device of the material handling apparatus shown in FIG. 1.

FIG. 3 is a top plan view of the gripping device.

DETAILED DESCRIPTION OF THE PREFERRED EMBODIMENT

Figure 4:
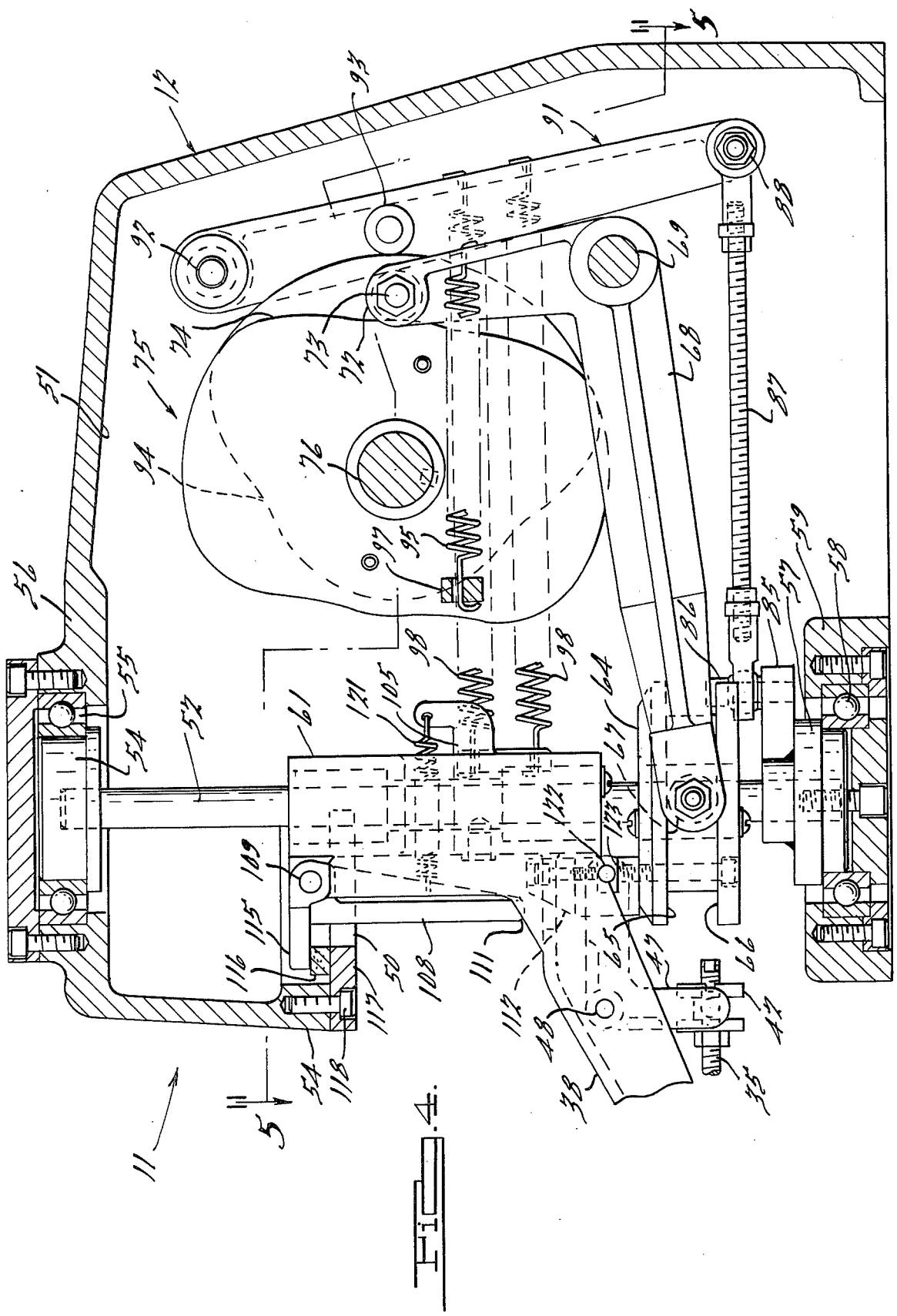
FIG. 4 is an enlarged, cross sectional view taken on a vertical plane through the material handling apparatus shown in FIG. 1.

A material handling apparatus embodying this invention is identified generally by the reference numeral 11. The material handling apparatus is adapted to be used with a variety of machine tool or other operations for moving workpieces between respective positions. As examples of applications for this device, the material handling apparatus 11 may be used to pick workpieces from a storage bin and place them onto a transfer table, remove workpieces from a transfer table or machine tool and place them on a conveyor, or move workpieces from one location to another in an assembly operation. Various other appliances for the material handling apparatus 11 will present themselves to those skilled in the art.

The material handling apparatus 11 includes an outer housing assembly 12 having an input drive assembly 13. The input drive assembly 13 transfers drive from a suitable power source (not shown) via motion transfer means, to be described, to a gripper assembly, indicated generally by the reference numeral 14.

The gripper assembly 14 includes a pair of gripping jaws 15 and 16 that are pivotally supported by means of pivot pins 17 and 18 upon a supporting member 18. The jaws 15 and 16 provide a detachable and adjustable connection to a respective pair of inserts 21 and 22. In the illustrated embodiment, the inserts 21 and 22 have facing cylindrical segmented surfaces 23 and 24 that are adapted to grippingly engage a workpiece.

The jaws 15 and 16 have inwardly projecting lever arm portions 27 and 28 that are received between a pair of facing shoulders 29 and 31 of an actuating element 34 which is slidably supported within the supporting member 19. An operating rod 35 is affixed to the actuating element 34 for reciprocating it between an opened position, as shown in the view of FIG. 3, to a closed position in which the jaw inserts 23 and 24 move together to grip a workpiece.

The supporting member 19 has a cylindrical trunnion portion 36 that is journaled in a complimentary surface of a saddle 37. The saddle 37 is integrally formed with an offset supporting arm 38. A clamping member 39 completes the support of the supporting member 19 and is affixed to the saddle 37, by socket head machine screws 41. Loosening of the machine screws 41 permits rotation of the supporting member 19 within the saddle 37 so that the orientation of the jaws 15 and 16 may be adjusted relative to the remainder of the material handling apparatus 11.

The operating rod 35 is threaded and adjustably supports an internally threaded collar 42. Oppositely facing shoulders, 43 and 44 are formed by the collar 42. A bifurcated jaw actuating mechanism 47 is received between the shoulders 43 and 44 and is pivotally supported on the arm 38 by means of a pivot pin 48.

Figure 5:
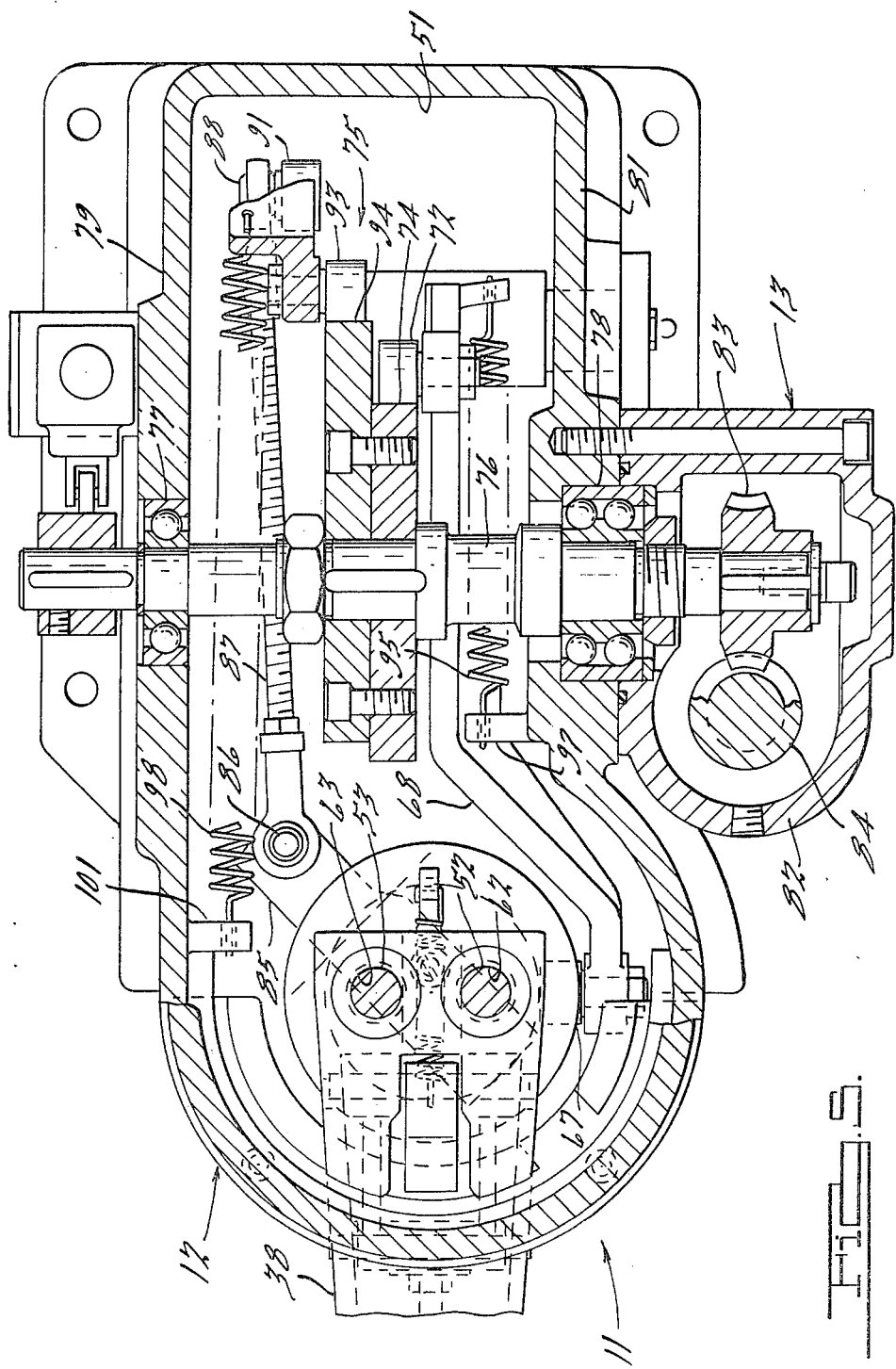
FIG. 5 is a cross sectional view taken along the line 5—5 of FIG. 4.

Referring now in detail to FIGS. 4 and 5, the outer housing 12 defines an enlarged internal cavity 51. A pair of vertically extending supporting rods 52 and 53 are supported at the forward end of the outer housing 12 adjacent to an opening 50 formed in an arcuate forward wall 54 of the outer housing 12. At their upper ends, the supporting rods 52 and 53 are affixed to a cylindrical member 54 that is rotatably journaled, by means of an anti-friction bearing 55 in the upper wall 56 of the outer housing 12. The lower ends of the rods 52 and 53 are also affixed to a cylindrical member 57 that is journaled by means of an anti-friction bearing 58 in the lower housing wall 59.

The arm 38 is formed inwardly of the housing opening 51 with a vertically extending supporting block portion 61. The supporting block 61 is formed with a pair of bores 62 and 63 for slidably supporting the block 61 and associated arm 38 upon the rods 52 and 53. The block 61, arm 38 and associated gripper mechanism 14 is, therefore, supported for rectilinear movement in the y-axis direction relative to the outer housing 12.

A trunnion member 64 also has a pair of vertically extending bores and is slidably supported on the support rods 52 and 53 below the block 61. The trunnion member 64 has a pair of oppositely facing shoulders 65 and 66 that receive therebetween a roller follower 67 that is carried at one end of a bell crank 68. The bell crank 68 is pivotally supported relative to the outer housing 12 by means of a pivot pin 69. The opposite arm of the bell crank 68 carries a roller follower 72 upon a pivot shaft 73. The roller follower 72 engages a first cam 74 of a timing mechanism, indicated generally by the reference numeral 75. The first cam 74 is affixed, in any known manner, to an input shaft 76 that is journaled by means of anti friction bearings 77 and 78 affixed in side walls 79 and 81 of the outer hosuing 12. The end of the shaft 76 journaled by the bearing 78 extends into a gear housing 82 affixed, in any known manner, to the housing wall 81. The gearhousing 82 forms a portion of the drive mechanism 13. The extending end of the shaft 76 carries a worm wheel 83 that is enmeshed with a driving worm 84 for rotating the shaft 76.

A crank arm 85 is affixed to the plate 57 in any known manner, as by welding. The crank arm 85 carries at its outer end an upstanding pivot pin 86. One end of an adjustable link 87 is connected to the pivot pin 86 by means of a spherical bearing. The other end of the adjusting link 87 is pivotally connected by means of a pivot connection 88 to a lever, indicated generally by the reference numeral 91. The link 91 is pivotally supported on the outer housing wall 79 by means of a pivot pin 92. Intermediate its ends, the lever 91 carries a follower 93 that is engaged with a second timing cam 94 fixed to the shaft 76.

The follower 72 of the bell crank 68 is urged into engagement with its respective cam 74 by means of a tension spring 95. One end of the tension spring 95 is affixed to the bell crank 68. The opposite end of the spring 95 is affixed to a lug 97 formed integrally with the side wall 81 of the outer housing 12.

In a like manner, the lever follower 93 is urged into engagement with its respective cam 94 by means of a pair of tension springs 98. One end of the tension springs 98 are affixed to the lever 91. The opposite ends of the springs 98 are connected to a lug 101 that is formed on the outer housing side wall 79.

A blocking lever 108 is pivotally supported upon the block 61 by means of a pivot pin 109. The blocking lever 108 has a projection 111 that is adapted to engage a resilient stop 112 affixed to the trunnion 64. The lever 108 has a follower portion 115 that is adapted to engage an arcuate ring 116 that is fixed at an appropriate location to an extension plate 117 that is in turn affixed to the outer housing front wall 54 by machine screws 118. As will become apparent, the location of the arcuate ring 116 determines the sequence of operation of the gripping mechanism 14.

A tension spring 121 is affixed to the lever 108 for urging its follower portion 115 into engagement with the segment 116. The opposite end of the tension spring 121 is affixed to a lug 105 affixed to the block 61.

OPERATION

The drawings show the material handling apparatus 11 in a home position with the gripping jaws 15 and 16 open. The apparatus 11 is set up in the described embodiment to grip a workpiece in the position shown in the figures, raise it, when viewed in accordance with FIG. 4, along the y-axis, subsequently pivot the workpiece about the y-axis to an extreme position, and subsequently lower it retraversing its movement along the y-axis where the piece is deposited. The gripping jaws then return to the home position as shown in FIG. 4 along the reverse path of movement while remaining in their opened position. The manner in which this motion is achieved will now be described in detail.

Considering specifically FIG. 4, the drive shaft 77 and the respective cams 74 and 94 rotate in a clockwise direction. In the position shown in FIG. 4, the cam 94 is at a high, dwell position whereas the cam 74 is at a low, dwell position. As the shaft 76 commences its clockwise rotation the cam 74 moves onto its ramp and effect pivotal movement of the bell crank 68 in a clockwise direction about the pivot pin 69. The follower 67 cooperates with the trunnion surface 65 to raise the trunnion member 64. Initial upward movement of the member 64 is accomplished while the block 61 remains in the position shown in FIG. 4. Thus, this initial movement causes a force to be exerted upon the gripper actuating lever 47. This force is transmitted to a pin 122 that is received in a v-shaped groove 123 of the block 112. The pin 122 is affixed to the jaw actuating member 47. Thus, the jaw actuating member 47 is pivoted in a counterclockwise direction drawing the actuating rod 35 and operating member 34 inwardly. This inward movement causes the jaws 15 and 16 to pivot toward each other about the pivot pins 17 and 18 and grip a workpiece.

Upon continued upward movement, a stop on the trunnion member 64 engages the block 61 and causes the block 61 to move upwardly in the y-axis direction along the rods 52 and 53. This upward movement causes the arm 38 and workpiece gripped by the jaw gripping mechanism 14 to be raised to an extreme upward position. When this position is reached, a dwell lobe on the cam 74 causes the bell crank 67 to be retained in its extreme clockwise pivotal position.

During the aforenoted movement, the cam lobe 94 was in a dwell position. Subsequently, however, it reaches a low position and the action of the springs 98 on the lever 91 causes it to pivot in a clockwise direction with the follower 93 following the surface of the cam 94. This pivotal movement is exerted through the link 87 onto the lever arm 85 to pivot the plate 57. This pivotal movement of the plate 57 is accompanied by rotation of the rods 52 and 53 and supporting mechanism carried thereby about a pivot axis, which coincides with the y-axis. During this pivotal movement, the jaws 15 and 16 remain in their closed position. When the gripping mechanism 14 and the associated workpiece have been rotated to the extreme limit of their movement, the cam 94 will enter a dwell phase to hold the rods 52 and 53 and associate mechanism in the angular position.

The cam 74 will at this time have rotated to a position in which the high lobe dwell portion is terminated and the lift will decrease. The spring 95 will urge the bell crank 68 in a counter-clockwise direction and cause lowering of the trunnion 64 and associated block 61. This movement continues with both elements moving downwardly until the blocking lever 108, follower portion 115 contacts the upper surface of the plate 117. At this location, the segment 116 is free of engagement with the blocking lever follower portion 115. The block 61 is precluded from downward movement and the trunnion member 61 will continue to move downwardly to pivot the lever 47 and cause the jaws 15 and 16 to reopen.

At this point, the spring 121 will cause the blocking lever 108 to pivot in a counter-clockwise direction, so that the end portion 111 is positioned above the resilient stop block 112.

Continued rotation of the shaft 76 causes the cam 74 to reach another peak or lobe and cause the bell crank 68 to be pivoted again in a clockwise direction. When this occurs, the trunnion member 64 will move upwardly. Any substantial lost motion between the member 64 and the block 61 will be precluded, however, due to the interposition of the blocking lever portion 111 above the resilient stop block 112. Thus, the block 61 will move upwardly along the y-axis substantially immediately upon raising of the trunnion member 64 and without any substantial relative motion therebetween. Therefore, the jaws 15 and 16 will be retained in their open position during the reverse travel. Once the motion in the y-axis has been traversed, the cam 94 will again actuate the lever 91 to rotate the rods 52 and 53 and associated mechanism carried thereby back in the pivotal direction around the y-axis to its home position.

When the mechanism is again lowered, the blocking lever follower portion 115 will again engage the segmented plate 116 to cause pivotal movement so that the jaws 15 and 16 are triggered so that they will be free to close during the next repeat cycle, as aforedescribed.

In describing the aforenoted mode of operation it has been assumed that all linear movement in the y-axis occurs before rotary motion about the y-axis is initiated. It should be readily understood, however, that merely changing the configuration of the cams 74 and 94 will alter this relationship of movements. By changing the location of the segment 116 from the position shown to the opposite extreme position, the reversal between the point of gripping and release may be altered. At the same time, it may be desirable to reverse the rotation of the shaft 77 to effect reverse movement of the mechanism.

Certain modifications in the operation of the device possible with the structure decribed have been previously mentioned. Various other modifications may be made without departing from the invention. For example, rather than using gripping jaws, the relative movement between the trunnion 64 and block 61 may be used to operate a small vacuum type pump. The gripping mechanism can, therefore, be of the suction type so as to eliminate the necessity for any mechanical engagement. It should also be noted that all movement of the respective elements is caused by springs or gravity. Therefore, if for any reason the gripping mechanism 14 or other components encounter an obstacle, the mechanism will not jam. For example, if a larger than anticipated workpiece is positioned between the jaw dies 21 and 22, no crushing force will be exerted upon the workpiece. The relative movement between the trunnion 64 and block 61 will just be stopped at an earlier time. Furthermore, if the gripping mechanism 14 or other components engage an obstacle on their outward or downward movement, the respective bell cranks will move free of their respective cam surfaces and no force other than that exerted by the springs 95 and 98 will be placed against the obstacle.

It is to be understood that the foregoing description is that of a preferred embodiment of the invention. Various changes and modifications may be made without departing from the spirit and scope of the invention as defined by the appended claims.

I claim:

1. A material handling apparatus comprising an outer housing having spaced bearing means, a pair of members rotatably supported by said spaced bearing means, a pair of spaced rods affixed to said members and extending between said bearing means, a carriage having a pair of spaced bores receiving said rods for slidably supporting said carriage upon said rods, a driven cam shaft rotatably supported in said housing and spaced from said bearing means, a first cam affixed to said cam shaft, a bell crank having a pair of arms and being pivotally supported within said housing, said bell crank having first follower means carried by one arm thereof in engagement with said first cam for pivoting said bell crank upon rotation of said first cam, means providing a sliding connection between the other arm of said bell crank and said carriage for moving said carriage along said rods in response to pivotal movement of said bell crank, said sliding connection being operative to permit rotation of said carriage relative to said bell crank arm, a second cam affixed to said cam shaft, a lever pivotally supported in said housing, second follower means affixed to said lever and engaging said second cam for pivoting said lever upon rotation of said second cam, a crank operably connected to said rods for rotating said rods in said bearing means, a connecting rod connecting said lever with said crank for rotating said rods about the axis determined by said bearing means in response to pivotal movement of said lever and for rotating said carriage about said pivotal axis, gripping means carried by said carriage and movable in sequence therewith from a home position to a work position in response to rotation of said cam shaft through a complete cycle.

2. A material handling apparatus as set forth in claim 1 wherein the housing has an opening in one face thereof, the rods and the carriage being juxtaposed to said opening, said carriage having an arm portion extending through said opening and carrying the gripping means at the exposed end of said arm.

3. A material handling apparatus as set forth in claim 1 wherein the gripping means are movable between an opened position and a closed position, and means responsive to the movement of the carriage to one of its positions for operating the gripping means from one of its positions to the other of its positions.

* * * * *